United States Patent
Thorpe et al.

(10) Patent No.: US 8,402,037 B2
(45) Date of Patent: Mar. 19, 2013

(54) INFORMATION HANDLING (75) Inventors: Jonathan Richard Thorpe, Winchester (GB); Alan Peter Birtles, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 456 days.

(21) Appl. No.: 12/439,748

(22) PCT Filed: Nov. 29, 2007

(86) PCT No.: PCT/GB2007/004583
§ 371 (c)(1),
(2), (4) Date: Mar. 3, 2009

(87) PCT Pub. No.: WO2008/068462
PCT Pub. Date: Jun. 12, 2008

(65) Prior Publication Data
US 2010/0023516 A1  Jan. 28, 2010

(30) Foreign Application Priority Data

Dec. 6, 2006  (GB) .................................. 0624420.6

(51) Int. Cl.
*G06F 17/30* (2006.01)
*G06F 7/00* (2006.01)
(52) U.S. Cl. ........................................ 707/751; 707/771
(52) U.S. Cl. ..............................................................
(58) Field of Classification Search .......... 707/650–670, 707/751, 771; 725/98–100, 130–135
See application file for complete search history.

(56) References Cited

U.S. PATENT DOCUMENTS

| 5,872,865 | A | 2/1999 | Normile et al. |
|---|---|---|---|
| 7,099,860 | B1 | 8/2006 | Liu et al. |
| 2004/0139105 | A1 | 7/2004 | Trepess et al. |
| 2004/0267740 | A1 | 12/2004 | Liu et al. |
| 2005/0004910 | A1 * | 1/2005 | Trepess ............................. 707/5 |

(Continued)

FOREIGN PATENT DOCUMENTS

| EP | 1 202 187 | 5/2002 |
|---|---|---|
| EP | 1 426 881 | 6/2004 |
| EP | 1 669 897 | 6/2006 |

OTHER PUBLICATIONS

Dorado, Andres et al., "A Rule-Based Video Annotation System", IEEE Transactions on Circuits and Systems for Video Technology, vol. 14, No. 5, pp. 622-633, XP-001195226, (2004).

(Continued)

*Primary Examiner* — Hosain Alam
*Assistant Examiner* — Navneet K Ahluwalia
(74) *Attorney, Agent, or Firm* — Oblon, Spivak, McClelland, Maier & Neustadt, L.L.P.

(57) ABSTRACT

An information handling apparatus in which textual metadata is generated in respect of a current information item in an ensemble of information items including: a mechanism that detects one or more predetermined properties of the current information item; a mechanism that detects a subset of information items from the ensemble of information items the subset being those which have the one or more predetermined properties most similar to those of the current information item; and a mechanism that selects one or more most frequently occurring words and/or phrases within textual metadata associated with the subset of information items, for use in textual metadata to be associated with the current information item.

12 Claims, 6 Drawing Sheets

U.S. PATENT DOCUMENTS

| | | |
|---|---|---|
| 2005/0055344 A1 | 3/2005 | Liu et al. |
| 2005/0060643 A1 | 3/2005 | Glass et al. |
| 2006/0036645 A1 | 2/2006 | Dao et al. |
| 2006/0143230 A1 | 6/2006 | Thorpe et al. |
| 2007/0113261 A1* | 5/2007 | Roman et al. ............... 725/134 |
| 2008/0141117 A1* | 6/2008 | King et al. .................. 715/238 |
| 2010/0121714 A1* | 5/2010 | Bovenschulte et al. .... 705/14.55 |

OTHER PUBLICATIONS

Abdel-Mottaleb, Mohamed et al., "Aspects of Multimedia Retrieval", Philips Journal of Research, vol. 50, No. 1/2, pp. 227-251, XP-000627673, (1996).

* cited by examiner

Fig. 5 tra

| train |
| track |
| train motion |
| train noise |
| transient |
| traditional |

INFORMATION HANDLING

This invention relates to information handling.

There are many established systems for locating information (e.g. documents, images, emails, patents, internet content or media content such as audio/video content) by searching under keywords. Examples include internet search "engines" such as those provided by "Google" ™ or "Yahoo" ™ where a search carried out by keyword leads to a list of results which are ranked by the search engine in order of perceived relevance.

Where the information items to be searched are audio and/or video items, effective searching can be more difficult. There has been some success with the automatic detection of content by analysis of the audio/video material, but this is not considered reliable or straightforward enough to allow accurate searching. Instead, textual metadata (additional data associated with the information item) remains the most useful way of searching for this type of information item.

The entry of textual metadata requires human input and can be very onerous, which in turn means that it can be very expensive.

There is a constant requirement to provide improved information handling techniques.

This invention provides information handling apparatus in which textual metadata is generated in respect of a current information item in an ensemble of information items, the apparatus comprising:

means for detecting one or more predetermined properties of the current information item;

means for detecting a subset of information items from the ensemble of information items, the subset being those which have the one or more predetermined properties most similar to those of the current information item; and means for selecting one or more most frequently occurring words and/or phrases within textual metadata associated with the subset of information items, for use in textual metadata to be associated with the current information item.

The invention provides an elegantly simple way of populating or pre-populating (suggesting candidate words and/or phrases for) textual metadata associated with an information item, based on textual metadata associated with other information items automatically detected to be similar.

Further respective aspects and features of the invention are defined in the appended claims.

Embodiments of the invention will now be described, by way of example only, with reference to the accompanying drawings in which.

Figure 1:
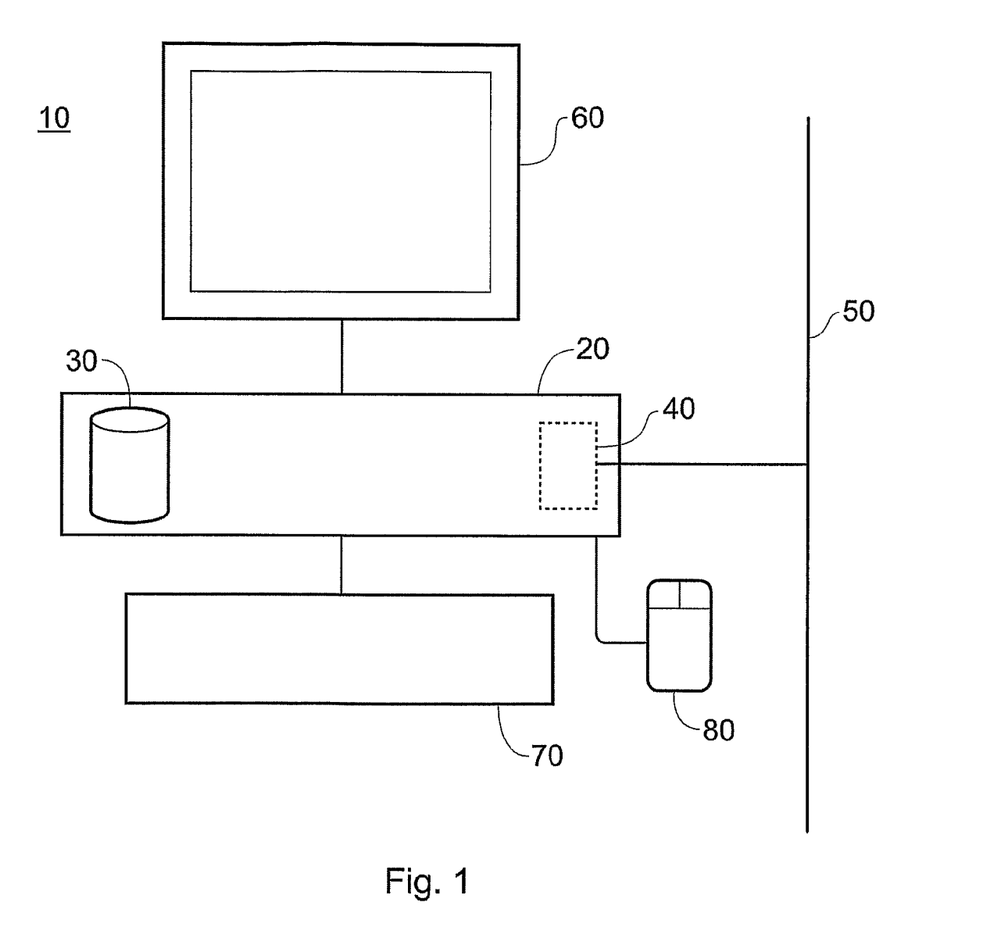
FIG. 1 schematically illustrates an information storage and retrieval system.

FIG. 1 is a schematic diagram of an information storage and retrieval system based around a general-purpose computer 10 having a processor unit 20 including disk storage 30 for programs and data, a network interface card 40 connected to a network 50 such as an Ethernet network or the Internet, a display device such as a cathode ray tube device 60, a keyboard 70 and a user input device such as a mouse 80. The system operates under program control, the programs being stored on the disk storage 30 and provided, for example, by the network 50, a removable disk (not shown) or a pre-installation on the disk storage 30.

The embodiments are applicable to many types of information items. A non-exhaustive list of appropriate types of information includes patents, video material, emails, presentations, internet content, broadcast content, business reports, audio material, graphics and clipart, photographs and the like, or combinations or mixtures of any of these. In the present description, reference will be made to audio/video information items, or at least information items having an audio and/or video content or association. For example, a piece of broadcast content such as audio and/or video material may have associated "MetaData" defining that material in textual terms.

The detailed example below refers to audio and/or video data information items and describes the detection of predetermined properties of such information items. Of course, other types of information item could be handled instead (or as well). For example, if the information items were still photographs, image properties of the photographs could be used to form feature vectors. Feature vectors could be formed from information items formed of text (e.g. on the basis of their textual content, number of words, distribution of uncommon words and the like), and so on.

The information items are loaded onto the disk storage 30 in a conventional manner. Preferably, they are stored as part of a database structure which allows for easier retrieval and indexing of the items, but this is not essential. Once the information and items have been so stored, a process is used to assist the user in applying textual metadata to the items. An example of such a process will be described below.

It will be appreciated that the indexed information data need not be stored on the local disk drive 30. The data could be stored on a remote drive connected to the system 10 via the network 50. Alternatively, the information may be stored in a distributed manner, for example at various sites across the internet. If the information is stored at different internet or network sites, a second level of information storage could be used to store locally a "link" (e.g. a URL) to the remote information, perhaps with an associated summary, abstract or MetaData associated with that link. So, the remotely held information need not be accessed unless the user selected the relevant link (e.g. from the results list 260 to be described below), although for the purposes of the technical description which follows, the remotely held information, or the abstract/summary/MetaData, or the link/URL could be considered as the "information item".

In other words, a formal definition of the "information item" is an item from which a feature vector is derived and processed (see below).

In a further example, the information items could be stored across a networked work group, such as a research team or a legal firm. A hybrid approach might involve some information items stored locally and/or some information items stored across a local area network and/or some information items stored across a wide area network.

It will also be appreciated that the system 10 of FIG. 1 is but one example of possible systems which could use the indexed information items. Another example will be described below with reference to FIG. 7. In general, practically any device having a display could be used for the information-accessing phase of operation.

The processes are not limited to particular numbers of information items.

Figure 2:
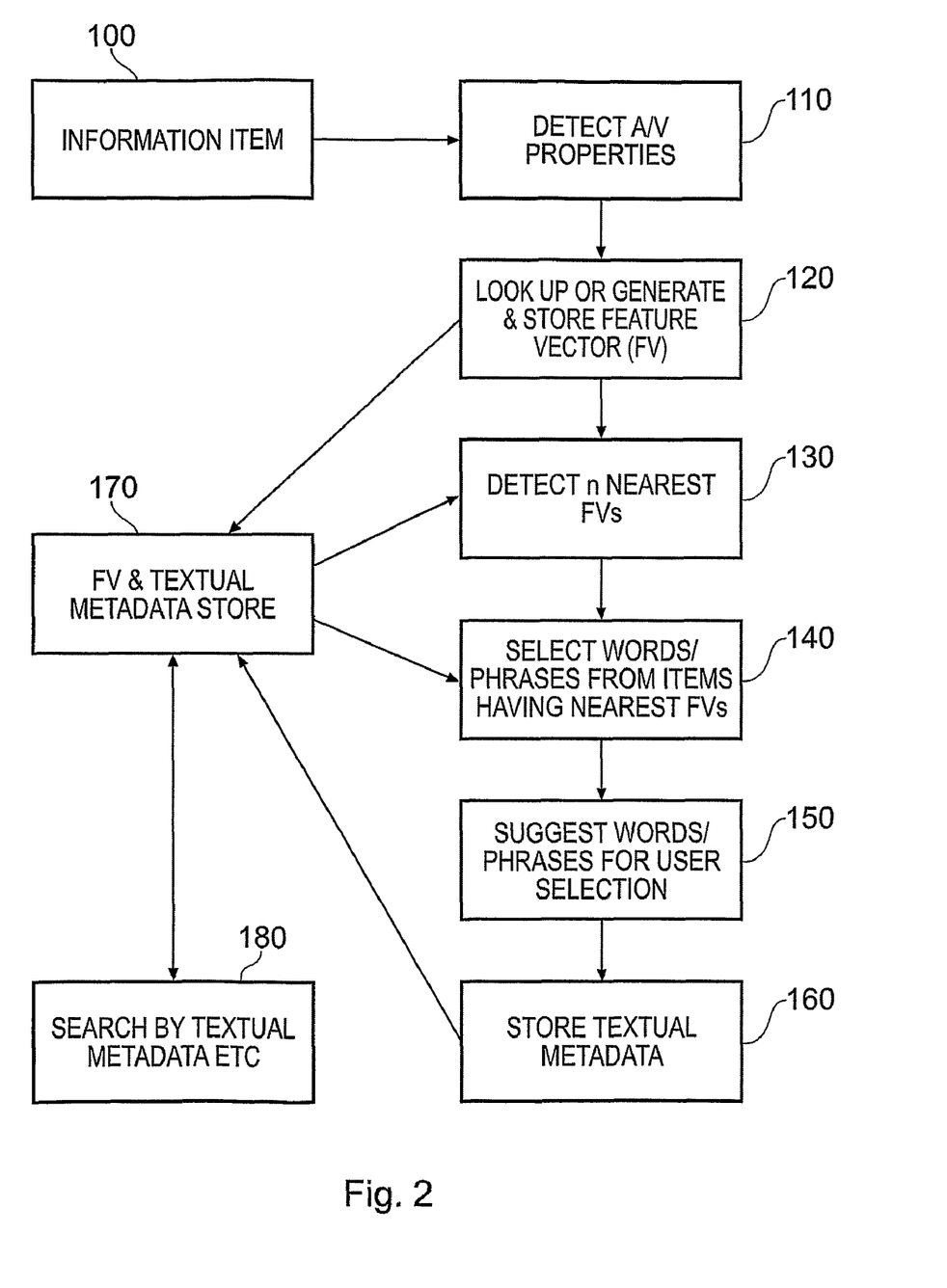
FIG. 2 is a schematic flow chart showing an overall operation of an embodiment of the present invention.

FIG. 2 is a schematic flowchart illustrating the operation of the present embodiment. It will be understood that the operations and storage requirements referred to in FIG. 2 may be carried out with respect to the apparatus described in reference to FIG. 1.

An information item 100 (from an ensemble of information items) including audio/video material is processed by steps 110, 120, 130, 140, 150 and 160 in order to generate textual metadata (e.g. a title, keywords and/or free text description) to be stored in a feature vector and textual metadata store 170 (which could be a separate store or could be formed by respective database entries associated with each information item). This allows a separate step 180 of searching by text to be carried out.

The steps 110 to 160 are particularly relevant to an information item for which textual metadata is being generated for the first time, i.e. no textual metadata is currently held in respect of that information item. However, the technique may also be applied to update or supplement the textual metadata associated with an information item, in which case it is likely that the detection of A/V properties in the step 110 (see below) and the generation of a feature vector in the step 120 (see below) will already have taken place.

Referring to the step 110, predetermined audio and/or video (A/V) properties of the information item 100 are detected. At the step 120 a feature vector (in fact, using the terminology below, a "reduced feature vector") is generated and stored in the feature vector and textual metadata store 170. The feature vector and textual metadata store 170 stores feature vector and textual metadata relating to some or (preferably) all of the ensemble of information items which have been processed by the system.

It is important, for the purposes of comparison of feature vectors (see below) that the feature vectors have a manageable length, or number of values, while still providing a useful representation of the information item. There is no absolute quantity for this. In the embodiment described below, a 30 value feature vector is used. Probably 3 values would be too few and 1000 values would require too much processing to compare the feature vectors, but it is for the skilled man to select an appropriate number of values in dependence on the available processing resources.

The steps 110 and 120 will be described in detail below with reference to FIG. 3.

At the step 130, the feature vector for the current information item 100 is compared with stored feature vectors in respect of other information items. The comparison is by the known technique of detecting a Euclidean distance between vectors in a q-dimensional space (where q is the number of values in each feature vector). The n closest feature vectors, representing the n information items which have the one or more predetermined properties (as detected by the step 110) closest to those of the information item 100, are selected by this test. The value n represents a subset of the total number of stored feature vectors. For example, n may be 20.

At the step 140 a selection is made from the textual metadata associated with the n closest information items. At the step 150, words and/or phrases are provided from this selection as suggestions to the user in respect of the current information item (although in other embodiments the current information item could be automatically populated with a predetermined number of most-frequently-occurring words and/or phrases from this selection, or with words and/or phrases having at least a threshold frequency of occurrence, or a combination of these). The process relevant to the steps 140 and 150 will be described in detail with reference to FIG. 4 below.

Finally, at the step 160, the textual metadata which has been chosen (by the user or automatically) to accompany the current information item is stored in respect of that information item in the feature vector and textual metadata store.

The step 180 schematically illustrates a separate process of searching for information items by textual metadata. It will of course be appreciated that this step may be carried out by the same apparatus at which the steps 110-160 were carried out, or by a different apparatus having access to at least the feature vector and textual metadata store 170.

Figure 3:
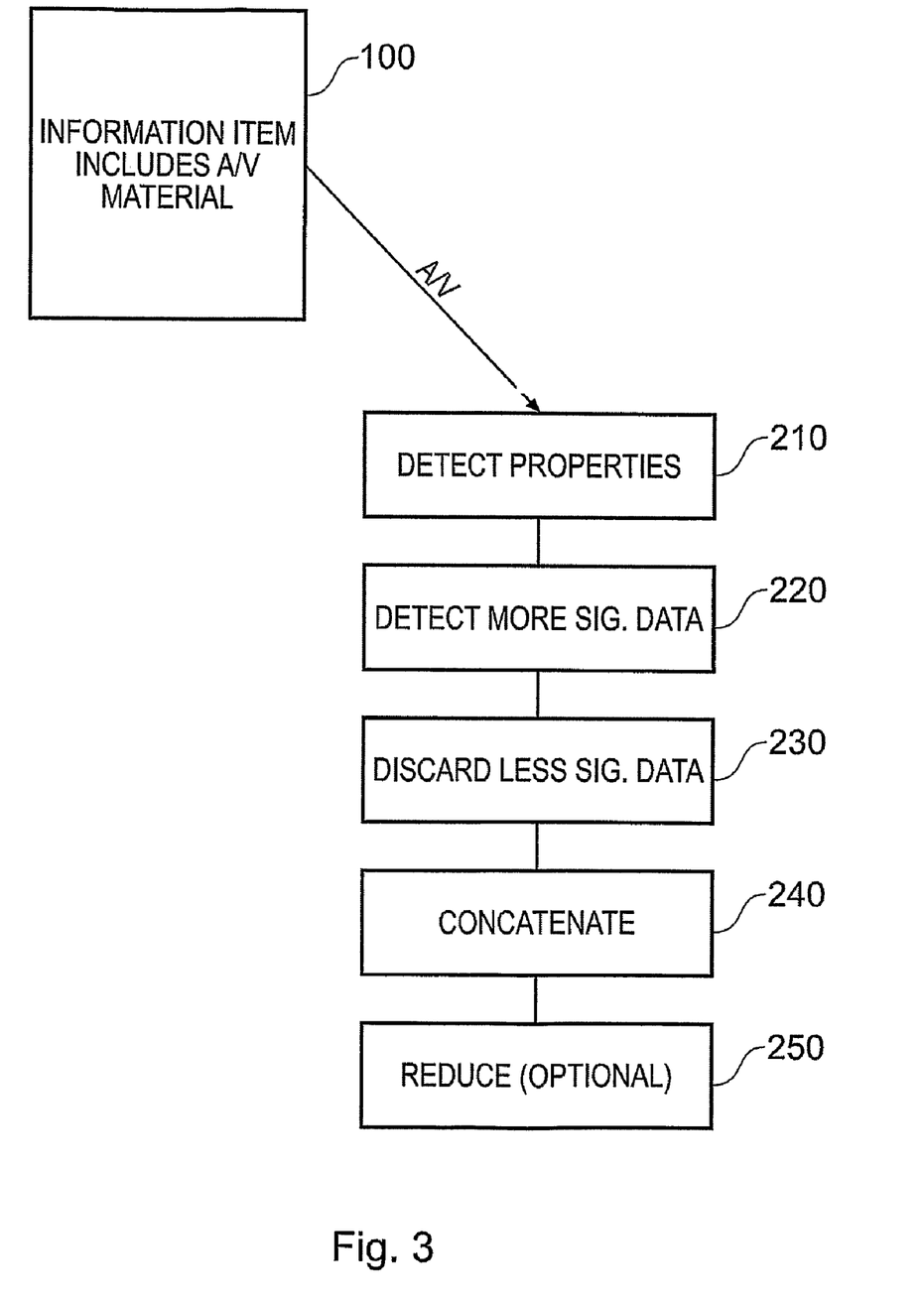
FIG. 3 is a schematic flow chart showing the generation of a reduced feature vector.

FIG. 3 is a schematic flow chart illustrating a so-called "feature extraction" process corresponding to the steps 110 and 120 of FIG. 2. Feature extraction is the process of transforming raw data into an abstract representation. These abstract representations can then be used for processes such as pattern classification, clustering and recognition. In this process, a so-called "feature vector" is generated, which is an abstract representation of the frequency of terms used within a document.

The basic steps of FIG. 3 are carried out in respect of information items 100 in a group of information items including audio and/or video material, as follows:

Audio and/or video properties of each information item in turn are detected at a step 210. At steps 220 and 230, a process of detecting the more significant and less significant property data is carried out, leading to the discarding of less significant property data. The remaining (non-discarded) property data is concatenated at a step 240 to generate a "reduced" feature vector. Once the "reduced" feature vectors have been generated for the information item collection, they are available for use in the step 130 of FIG. 2.

An optional further reduction process (e.g. by the known technique of random vector mapping, involving matrix-multiplying a p-valued feature vector by a p×q matrix of random numbers to generate a q-valued feature vector) may optionally be carried out. However, such a further step is not relevant to the present embodiment where a 30-valued feature vector is generated by the process to be described below. Of course, the skilled man will appreciate that random vector mapping could be used in place of the steps 220, 230 and 240 to produce a feature vector of a manageable size.

The steps 220 to 240 could be carried out in another order, so that the data is discarded after concatenation (or indeed the discarding process could occur before or after concatenation).

The steps 210 to 240 will now be described in detail.

The aim of the technique is to automatically extract (from audio and video) a feature vector that represents a media item's genre with as few variables as possible (or at least a reduced number of variables); this feature vector is from now on called "reduced feature vector".

The reduced feature vector consists of a combination of several "basic feature vectors". The basic feature vectors encapsulate a specific type of feature like colours, shape etc. The first stage, represented by the step 210, is to detect so-called "basic feature vectors" representing respective properties of the information item.

Creation of the Basic Feature Vectors

There are five types of basic feature vectors that we have used in the present embodiment; these are Colour, Shape, Audio, Face and Edge/plain based feature vectors. In fact the reduced feature vector described below does not make reference to the Edge/plain data, but this technique is included to illustrate a further source of possible feature data. It should also be understood that the permutations set out below are simply examples and that other permutations of vectors could be used.

Colour

There are several colour models that could be used. Some examples are described below.

For each colour model, a 20-bin histogram is calculated for each frame in a media item, the average and standard deviation for each column in the histogram is taken over the whole media item. The average and standard deviation vectors are used as basic feature vectors representing a media item. The concatenation of the average and standard deviation is also used as a basic feature vectors and is then called "combination" in the list below. The colour models and feature vectors calculated from them are:

HUE Histogram
Average
Standard Deviation
Combination (concatenated average and Standard Deviation vectors)
Luminance Histogram
Average
Standard Deviation
Combination (concatenated average and Standard Deviation vectors)
Red Histogram
Average
Standard Deviation
Combination (concatenated average and Standard Deviation vectors)
Green Histogram
Average
Standard Deviation
Combination (concatenated average and Standard Deviation vectors)
Blue Histogram
Average
Standard Deviation
Combination (concatenated average and Standard Deviation vectors)
RGB Histogram (60 bins, combination of three different histograms)
Average
Standard Deviation
Combination (concatenated average and Standard Deviation vectors)

Shape

Two different types of shape descriptors are described; the difference between them is the step after the Fast Fourier Transform (FFT), step 4. Overall the shape descriptor is extracted in the following way:

1. Each frame is resized to an 64*64 image, for example by bilinear interpolation
2. A fast Fourier transform (FFT) is taken from the resized frame.
3. The first 10 frequency values (lowest frequencies) in each direction are processed (see below) and combined to a 100-value long feature vector.
4. The average and standard deviation for each column in the vector is taken over the whole media item, which gives three feature vectors per post processing method.
   i. Average
   ii. Standard Deviation
   iii. Combination (average and standard deviation feature vector concatenated)

Face

Two different types of face based feature vectors are described; one called "face features" and the other one called "face statistics".

The face statistics basic feature vector is generated as follows:

1. For each frame, calculate the following 3 variables:
   Face count, i.e. how many faces there are within the frame
   Average face size for all the faces within the frame
   Average x(horizontal) position for all the faces in the frame
2. The average and standard deviation are then calculated for all the 3 variables over all the frames within the media item
3. The average and standard deviation for the face-count, size and x-position form a 6 variable feature vector.

The face features basic feature vector is generated as follows:

1. A face classifier that classifies all the faces in a frame into 6 different classes depending on face size and face x-position is used.
   The face classifier works in the following way:
   a. If the size of a face is bigger than 21 pixels (e.g. in width) it is classified as subclass A, and if it is smaller than 21 pixels it is classified as subclass B.
   b. Both subclass A and B are split to three different subclasses, depending on if the face x-position is less than 74 (e.g. pixels from the left), between 74 and 114 or above 114.
2. Each media item has a 7-bin histogram, where the first bin represents frames with no faces; the other bins represent the 6 different face classes. For each frame being analysed each face found increases the bin that its classification belong to by one.
3. The histogram forms a 7-bin basic feature vector that represents a media item.

Audio

Assuming the available audio has a sample rate of 48 kHz; the audio is sampled in 32 ms windows with 16 ms overlap, giving a total of N=1536 samples. The rms amplitude is defined as $$r_j = \sum_{i=1}^{N}(s_i)^2$$

and a frame is defined as silent if $r_j<0.2*\bar{r}$ where j is the audio frame and $\bar{r}$ the average rms amplitude over the entire media item.

First, the entire signal is Hamming-windowed with $$W_i = 0.54 - 0.46 * \cos\left(\frac{2\pi i}{N}\right)$$

and thereafter the FFT coefficients $F(\omega)$ are calculated for all the frames. Then the following features are calculated for each audio frame:

Total Spectrum Power. The logarithm of the spectrum power is used:

$$P = \log\left(\int_0^{\omega_0}|F(\omega)|^2 d\omega\right)$$

where $|F(\omega)|^2$ represents the power at frequency $\omega$ and where, $\omega_0$=24 kHz, the half sampling frequency.

Subband Powers. Four subband powers with the following intervals are used $$[0, \frac{\omega_0}{8}], [\frac{\omega_0}{8}, \frac{\omega_0}{4}], [\frac{\omega_0}{4}, \frac{\omega_0}{2}] \text{ and } [\frac{\omega_0}{2}, \omega_0].$$

The power of the subband is calculated the following way:

$$P_j = \log\left(\int_{L_j}^{H_j} |F(\omega)|^2 \, d\omega\right)$$

where $H_j$ represents the highest frequency and $L_j$ represents the lowest frequency in the interval.

Brightness. Brightness is defined as the frequency centroid, and is calculated the following way.

$$\omega_c = \frac{\int_0^{\omega_0} \omega * |F(\omega)|^2 \, d\omega}{\int_0^{\omega_0} |F(\omega)|^2 \, d\omega}$$

Bandwidth. Bandwidth B is calculated the following way:

$$B = \frac{\int_0^{\omega_0} (\omega - \omega_c)^2 * |F(\omega)|^2 \, d\omega}{\int_0^{\omega_0} |F(\omega)|^2 \, d\omega}$$

Pitch frequency

The pitch frequency is determined in the following way:
1. The power spectrum is calculated for each audio frame
2. The power spectrums peaks are emphasised with the discrete operator: {0.25f, 0.75f, 1.0f, 0.75f, 0.25f}.
3. The harmonic of the audio window is calculated the following way:
   a. A comb filter that starts with pitch 50 Hz is increased successively until it reaches a pitch of 1000 Hz. For each step the difference between the comb filtered signal "C" and the noise "N" taken.
   i. The comb filter value is calculated in the following way:
   $C_i = 2.25 * S_{i-1} + 1.5 * S_i + 2.25 * S_{i+1}$ where "i" is the pitch frequency and "S" the enhanced signal. Observe that if S=1 for [i−1, i, i+1] then C=6.
   ii. The noise is calculated the following way:

$$N_i = S_{i-\frac{4*i}{6}} + S_{i-\frac{3*i}{6}} + S_{i-\frac{2*i}{6}} + S_{i+\frac{2*i}{6}} + S_{i+\frac{3*i}{6}} + S_{i+\frac{4*i}{6}}$$

Observe that is S=1 for $$\left[i - \frac{4*i}{6}, i - \frac{3*i}{6}, i - \frac{3*i}{6}, i + \frac{2*i}{6}, i + \frac{3*i}{6}, i + \frac{4*i}{6}\right]$$

then N=6.

4. This will form a frequency vs. harmonic diagram; the peak of the harmonics gives the pitch frequency.

Mel-Frequency cepstral Coefficients are computed from the FFT power coefficients. A triangular bandpass filter bank filters the coefficients. The filter bank consists of 19-triangular filters with constant mel-frequency intervals covering the frequency range 0-4000 Hz. $S_k\{k=1, 2, \ldots K\}$ denotes the output from the filter bank. The mel-frequency spectrum is calculated the following way:

$$c_n = \sqrt{\frac{2}{K} * \sum_{k=1}^{k} \log(S_k) * \cos\left(n * [k - 0.5] * \frac{\pi}{K}\right)}$$

where n=1, 2, 3 . . . 12 is the order of the cepstrum.

The features described above forms a 20-value feature vector, the average and standard deviation is taken column wise over the whole media, and concatenated to a 40-value feature vector. A 41 variable is added to the feature vector by taking the ratio of silent frames verses total amount of frames for the whole media item.

Edge/Plain Field Feature Vector

Another basic feature vector will now be defined. This is the so called edge/plain field histogram (EPFH) feature vector. It is generated by two basic steps:
1. The quantisation of the colour values in the image.
2. Creation of EPFH The Quantisation of the Colour Space The process starts from a HSV (Hue Saturation Value) coded image, where $0 \leq H \leq 360$, $0 \leq S \leq 1$, $0 \leq V \leq 1$. If the image under consideration is not provided in this format, it is a straightforward (and known) mapping operation to convert it to this format.

If the HSV colour space were visualised, it would be in the form of a cone. The quantification step aims to divide the cone into different blocks. Each block is indexed with a number; the number itself is irrelevant the only function of the number is to work as an index.

The index is the value generated (or "returned") by the saturation quantisation set out first. This in turn refers to hue and luminance quantisation set out below.

The Saturation is Quantised into 4 Parts:

| | | |
|---|---|---|
| 0.00 < Saturation ≦ 0.03 | →Achromatic | return LuminanceA |
| 0.03 < Saturation ≦ 0.33 | →Low Chromatic | return 7*LuminanceC + Hue − 1 |
| 0.33 < Saturation ≦ 0.66 | →Medium Chromatic | return (3 + LuminanceC)*7 + Hue − 1 |
| 0.66 < Saturation ≦ 1 | →High Chromatic | return (6 + LuminanceC)*7 + Hue − 1 |

In the case of the last three categories, the hue and luminance are quantised as follows:

The Hue is Quantised into 7 Non-Uniform Parts:

| | | |
|---|---|---|
| 330 < hue ≦ 22 | return 1 | //red |
| 22 < hue ≦ 45 | return 2 | //orange |
| 45 < hue ≦ 70 | return 3 | //yellow |
| 70 < hue ≦ 155 | return 4 | //green |
| 155 < hue ≦ 186 | return 5 | //cyan |
| 186 < hue ≦ 278 | return 6 | //blue |
| 278 < hue ≦ 330 | return 7 | //purple |

The LuminanceC (Value) is Quantised in 3 Parts:

| | | |
|---|---|---|
| $0.00 < \text{Saturation} \leq 0.33$ | →Low Luminance | return 0 |
| $0.33 < \text{Saturation} \leq 0.66$ | →Medium Luminance | return 1 |
| $0.66 < \text{Saturation} \leq 1$ | →High Luminance | return 2 |

In the case of a classification as "achromatic", the luminance value is quantised:
The LuminanceA (Value) is Quantised in 4 Parts in an Achromatic Region:

| | | |
|---|---|---|
| $0.00 < \text{Luminance} \leq 0.25$ | →White | return 63 |
| $0.25 < \text{Luminance} \leq 0.50$ | →Light Grey | return 64 |
| $0.50 < \text{Luminance} \leq 0.75$ | →Bark Grey | return 65 |
| $0.75 < \text{Luminance} \leq 1$ | →Black | return 66 |

The Creation of EPFH

Next, iterating through the pixels in an image, each pixel (centre pixel) is compared with its surrounding pixels (that is a group of 8 pixels). If any one of the surrounding pixels has a different colour index value than the current centre pixel then the centre pixel is considered a "edge" pixel; otherwise it is considered a plain field pixel.

To avoid confusion, the term "centre" refers to the pixel's spatial (image) position with relation to the pixels with whose colour properties it is being compared. The terms "edge" and "plain field" refer to the current centre pixel's position in colour space with reference to the spatially surrounding pixels.

If a pixel is classified as an edge pixel it is added to an "edge" histogram; otherwise it is added to a "plain field" histogram.

The bins in each of the histograms are the colour indices described above.

Post Processing of the Feature Vectors

The edge histogram and the plain field histogram are both individually normalised so their length equals 1. The ratio of edge pixels to total pixels in the image is also calculated (the "edge ratio").

The final feature vector comprise a concatenation of the normalised edge histogram, the normalised plain field histogram and the edge ratio.

Creation of Reduced Feature Vector Subparts

Colour

The basic colour feature vector consists of the average and standard deviation of a 60 bin RGB histogram (20 bin per colour) over the whole media item. This gives a feature vector consisting of 120 variables.

The colour histogram is transformed with the Hotelling transform and truncated so that the 7 first variables are kept.

The Hotelling Transform is based on statistical properties of the feature vectors. A transformation of a 20 variable vector will result in a 20 variable vector with the top/first variables being the one with most variance (i.e. they could be considered to be the more significant variables). This means that the transform moves the most important features in the feature vector to the beginning of the vector.

Shape

Each frame is resized from its starting size (e.g. 720*576 pixels) to 64*64 with bilinear interpolation. The 64*64 image is transformed by an FFT process and the logs of the power of the 10 lowest frequencies plus one are saved:

$$D(u,v) = 10 * \log(1 + |F(u,v)|)$$

This forms a 100-value long vector. These vectors are produced for each frame, and the average and standard deviation over the whole media item is used as a feature vector. This means that we have a 200-value long feature vector.

The shape feature vector is transformed with the Hotelling transform and truncated so that the 10 first variables are kept.

Audio

The audio feature is created as described above and that creates a 41-value feature vector. The 7 most significant values (as detected by the Hotelling transform) are retained.

Face

The face feature vector is created as described above and that creates a 6-value feature vector.

Concatenation and Normalisation

The sub-feature vectors are normalised with mean standard deviation normalisation and concatenated to form a 30-value feature vector.

Figure 4:
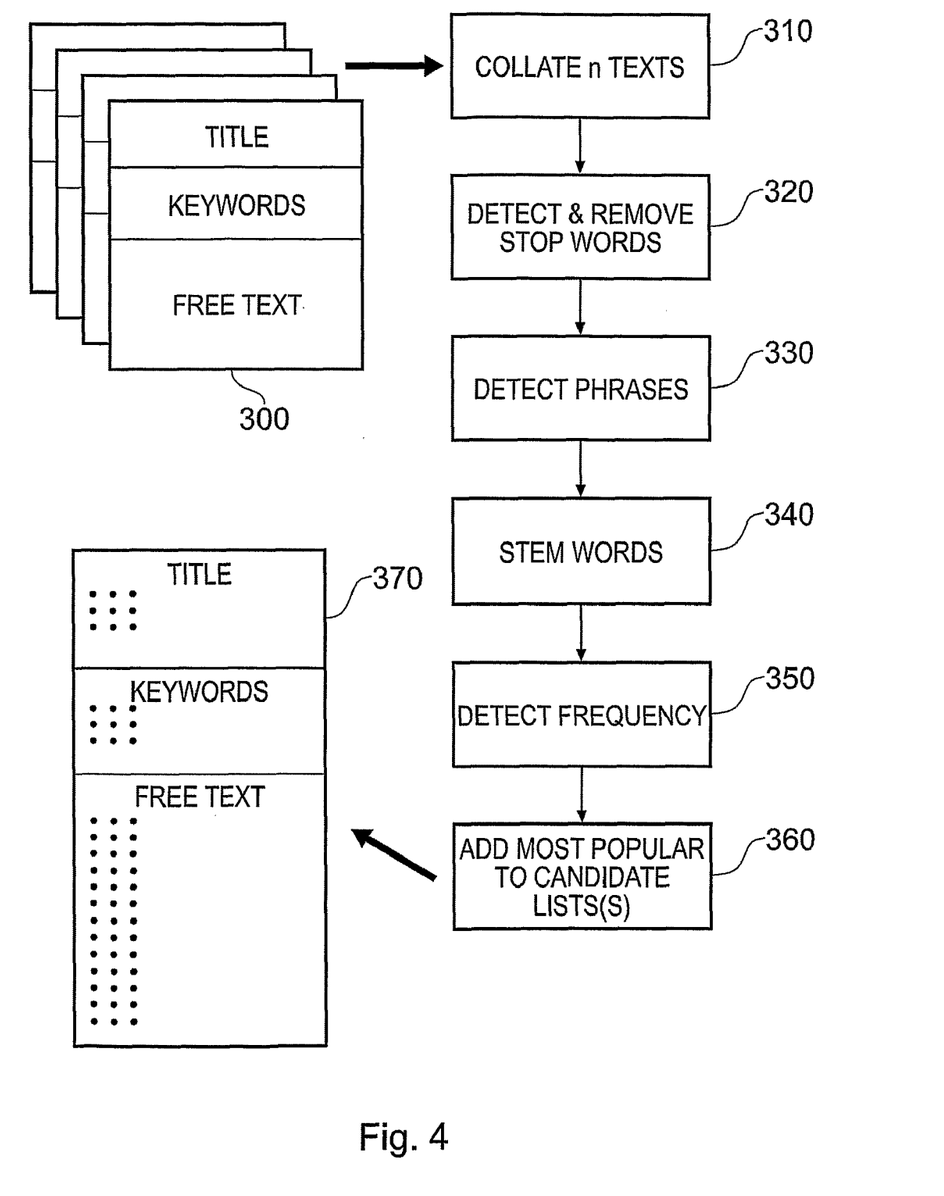
FIG. 4 is a schematic flow chart showing the generation of a candidate word/phrase list.

FIG. 4 schematically illustrates a process corresponding to the steps 140 and 150 of FIG. 2. It is assumed that the n closest information items (in terms of their feature vectors) have been identified at the step 130, and that textual metadata 300 in respect of at least some of those information items is stored in the feature vector and textual metadata store 170.

In the present example, the textual metadata 300 is arranged as a title, some keywords and some free text description of the information item. It will of course be appreciated that this exact arrangement is not essential and indeed that the textual metadata need not be partitioned at all.

At a step 310 the textual metadata corresponding to the n nearest information items (or at least those which have some textual metadata) is collated into a single set for a sorting process. In the description which follows, this collated set of textual metadata will be considered as a document, but this is just for ease of description and understanding.

At a step 320, all "stop words" are removed from the document. Stop-words are extremely common words on a pre-prepared list, such as "a", "the", "however", "about", "and", and "the". These words are sufficiently common that they are not likely to be useful as information item-specific suggestions to the user or as automatically generated textual metadata.

The detection of stop words serves another purpose, which is to delimit "phrases" at a step 330. In other words, a phrase is considered to be those words (or the first predetermined number, e.g. 3, of such words in the case of longer phrases) between two stop words. In the present system phrases are treated as words for the assessment of frequency of occurrence and the suggestion of candidate items for inclusion in the textual metadata.

After removing stop-words and detection of phrases, the remaining words are "stemmed" at a step 340, which involves finding the common stem of a word's variants. For example the words "thrower", "throws", and "throwing" have the common stem of "throw".

At a step 350, the stemmed words and phrases are sorted by frequency of occurrence, and the most frequently occurring words or phrases are identified. Where such a word had been stemmed, the most frequently occurring version of that word prior to the stemming process is used as the version to be presented to the user. At a step 360 a number of the most frequently occurring such words and phrases are added to a candidate list 370 of words and phrases to be presented to the user in respect of the current information item.

The example candidate list 370 shown in FIG. 4 has different sub-lists in respect of the title, keyword and free text metadata fields. The analysis of the steps 310-360 could be carried out separately for these three fields in the data 300. Or the lists could be based on the same selection, but perhaps with fewer entries in the title and keyword lists. Or as an alternative, a single candidate list could be provided.

Figure 5:
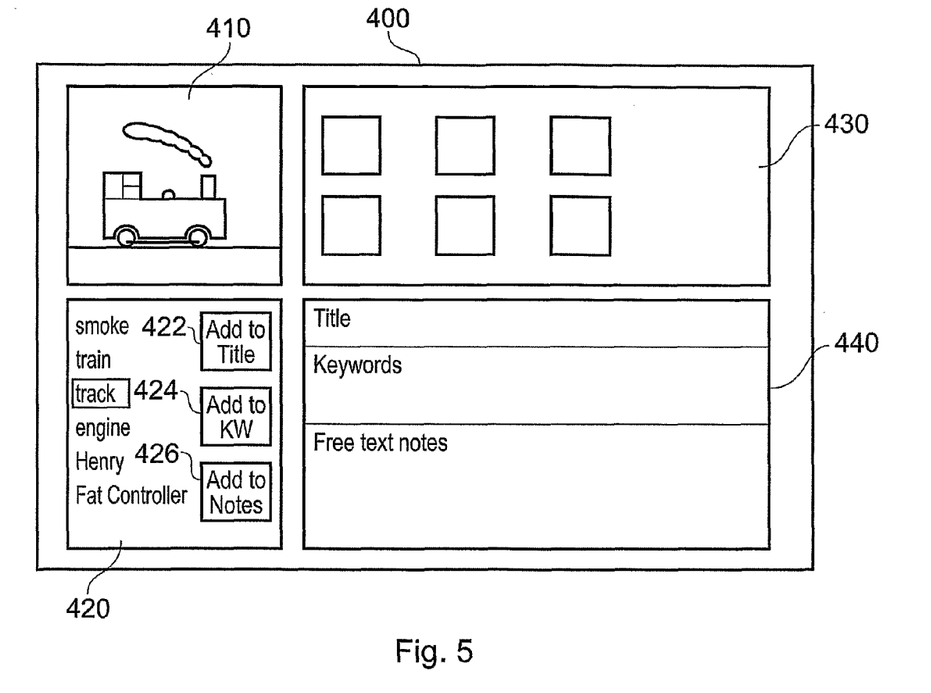
FIG. 5 schematically illustrates a display screen.

FIG. 5 schematically illustrates a screen display 400 of the apparatus of FIG. 1 when the step 150 is being carried out.

Various display windows are provided: a window 410 displays a representative image from the current information item; a window 420 provides suggested candidate words and phrases for textual metadata entries; a window 430 displays (smaller) representative images of the nearest information items, or a nearest subset of them, as selected in the step 130; and a window 440 provides a text entry area.

In the example shown in FIG. 5, a single list of candidate words and phrases is provided in the window 420, although as explained above, separate lists could be generated for different textual metadata fields. Three user buttons 422, 424 and 426, operable by a user control such as a mouse control, are provided. Each of these has the effect of adding a currently highlighted word (e.g. the word "track" as shown) to a respective textual metadata field. Of course, the user can simply type a word into the respective field, whether or not it appears in the candidate list.

Figure 6:
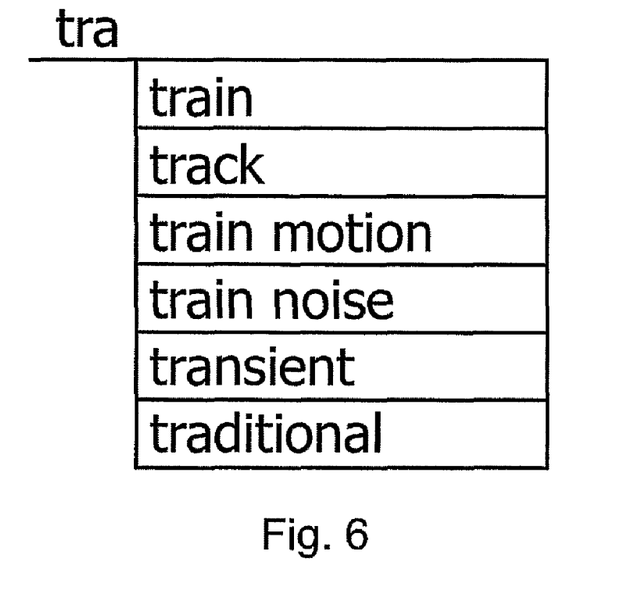
FIG. 6 schematically illustrates a word/phrase suggestion box.

The window 440 is partitioned into the various textual metadata fields and allows candidate words to be inserted or other words simply to be typed. A feature is the use of typing selections, as shown schematically in FIG. 6. If a user starts to type, say, the letters "tra", the system selects the most frequently occurring words and phrases in the candidate list(s) starting with those letters and offers them for selection by the user.

It will be appreciated that the "words and phrases" need not be words found in a conventional dictionary, and nor need they be grammatical. For example, they could be classification terms such as patent classification indices.

The words and phrases could be pre-sorted according to the field or genre of the information item. So, using an overall reference dictionary (not shown), some words could be excluded from the suggestions made to the user if they are inappropriate to the type of information item being dealt with.

The order in which the words and phrases are offered may be an order of frequency, so that the most frequently occurring words and/or phrases within the n closest information items are listed. Or the order could be associated with how close each word's corresponding information item is to the current information item under test. So, the word listed at the top of the list would have the same letter(s) as the letter(s) typed by the user and would come from the textual metadata associated with the information item which is closest (amongst those having words starting with the user-entered letters) to the current information item. Or a combination strategy could be used, in which the "raw" frequency of occurrence of the words and phrases amongst the n closest items is weighted by a factor relating to the closeness of the information items. For example, the following ranking factor could be used:

$$\text{rankingfactor}_{word} = (\text{frequency of occurrence}_{word}/(\text{distance}_{item}\char`\^3)$$

where distance$_{item}$ represents the Euclidean distance between the information item containing that word (or the nearest such information item if there is more than one) and the current information item.

It will be seen that the system can use a larger set of words and phrases for this process than it need display in the window 420, because of the sorting effect of the user typing the initial letters. As the user types or changes any further letters, the list shown in FIG. 6 will be revised to include only those words and phrases starting with the current set of letters as typed by the user. The user may select one of these suggestions by a mouse click or by moving a cursor (not shown) up and down using cursor control keys and pressing "enter" at a desired word or phrase.

Figure 7:
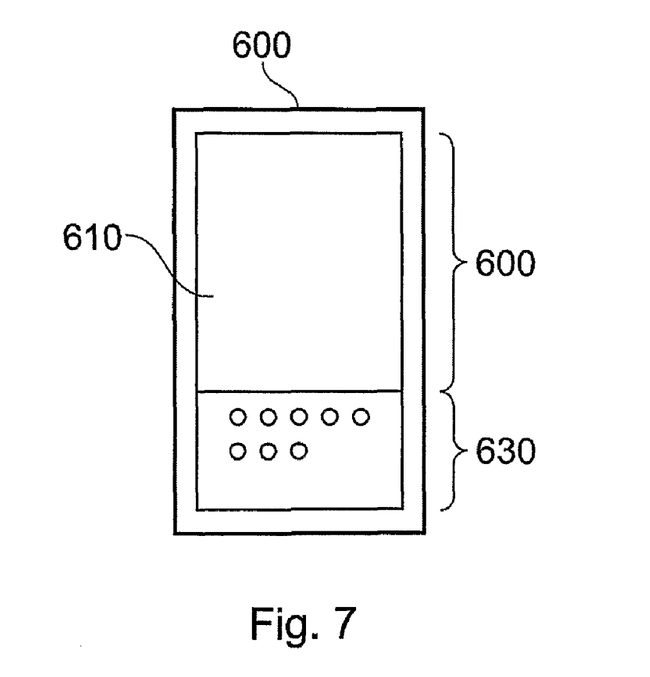
FIG. 7 schematically illustrates a personal digital assistant (PDA).

FIG. 7 schematically illustrates a personal digital assistant (PDA) 600, as an example of portable data processing apparatus, having a display screen 610 including a display area 620 and a touch sensitive area 630 providing user controls; along with data processing and storage (not shown). Again, the skilled man will be aware of alternatives in this field. The PDA may be used as described above in place of or in association with the system of FIG. 1, possibly accessing information items and/or metadata stored on the system of FIG. 1, for example via a wireless link (not shown).

General Notes on the Hotelling Transform

The Hotelling transform is also known as Principal component, eigenvector and discrete Karhunen-Loéve transform. The Hotelling transform is a very useful way to reduce the redundancy within feature vectors.

Consider a population of vectors.

$$X = \begin{bmatrix} x_1 \\ x_2 \\ x_3 \\ x_4 \end{bmatrix}$$

With a mean vector $$m_x = E(x)$$

And a covariance matrix $$C_x = E((x-m_x)(x-m_x)^T)$$

If one takes the eigenvalues and the matching eigenvectors and order the eigenvectors in a order matching the decreasing values of the eigenvalues one get matrix A.

$$A = \text{eig}(C_x)$$

The Hotelling transform is then described with the following formula:

$$y = A \cdot (x - m_x)$$

Where x is transformed to y. The first dimension in the y vector has the highest variance; the second dimension has the second highest variance, etc. This is due to the fact that we organise the eigenvector with respect to the size of the eigenvalues.

General Notes on Vector Normalisation

Vector normalisation is a standard algebraic procedure, where one divides the vector by its own norm. This results in a vector of length 1.

$$v_{normalized} = \frac{v}{\|v\|}$$

$$\|v_{normalized}\| = 1$$

General Notes on Column Linear Transformation Normalisation

For each column one finds the min and max and transforms it to a new min and max.

$$x_{new} = x_{old} \cdot a + m$$

$$a = \frac{x_{new}^{max} - x_{new}^{min}}{x_{old}^{max} - x_{old}^{min}}$$

$$m = x_{new}^{max} - x_{old}^{max} \cdot a$$

General Notes on Mean and Standard Deviation Normalisation

Mean and Standard deviation normalisation is a type of column normalisation. The mean and standard deviation is taken column wise. Each value is then translated by the mean and divided by the standards deviation for that column.

$$x_{new} = \frac{(x_{old} - \text{mean})}{stdDev}$$

The invention claimed is:

1. An information handling apparatus in which textual metadata is generated and associated with a current information item based on metadata from a plurality of other information items, the apparatus comprising:
   a processor configured to perform as a property detector and configured to detect one or more predetermined properties of the current information item, the information items comprising audio and/or video data, and the property detector configured to detect one or more properties of the audio and/or video data;
   the processor also configured to perform as a subset detector and configured to detect a subset of the plurality of other information items, the subset being other information items which have the one or more predetermined properties most similar to the one or more predetermined properties of the current information item;
   a display arrangement configured to display to a user a selectable list of one or more of the most frequently occurring words and/or phrases within textual metadata associated with the subset of the plurality of other information items;
   a selector configured to receive a selection from the user of one or more of the displayed most frequently occurring words and/or phrases from the selectable list for use in textual metadata and to associate the words and/or phrases in the selection with the current information item; and
   a feature vector generator configured to generate a feature vector comprising feature data values indicative of the one or more predetermined properties of the current information item, and the subset detector is configured to detect those information items having a feature vector having a shortest Euclidean distance from the feature vector of the current information item.

2. The apparatus according to claim 1, wherein the one or more predetermined properties include one or more properties selected from the list comprising: hue statistical distribution; luminance statistical distribution; color component statistical distribution; image shape; face detection statistics; audio power; audio sub-band powers; audio brightness; audio bandwidth; audio pitch; and audio mel-frequency properties.

3. The apparatus according to claim 1, further comprising:
   a data discarder configured to discard feature data relating to less significant properties of the information items.

4. The apparatus according to claim 1, further comprising:
   a feature vector store configured to store feature vectors in respect of at least some of the plurality of information items.

5. The apparatus according to claim 1, further comprising:
   a stop word detector configured to exclude a predetermined list of commonly occurring words from the selected one or more most frequently occurring words and/or phrases.

6. The apparatus according to claim 1, wherein the one or more most frequently occurring words and/or phrases are selected in respect of the frequency of occurrence of respective word stems and/or similarity of corresponding information item's properties to the current information item's properties.

7. The apparatus according to claim 1, wherein the list is ordered by frequency of occurrence of respective word stems and/or similarity of corresponding information item's properties to the current information item's properties.

8. The apparatus according to claim 7, further comprising:
   a user input device for the user to enter one or more letters, and in which the list comprises words and/or phrases starting with the letter(s) entered by the user.

9. The apparatus according to claim 1, wherein the display arrangement revises the selectable list to include only word or phrases beginning with letters currently input by the user.

10. The apparatus according to claim 1, wherein the subset detector detects the subset of the plurality of other information items that does not include textual metadata.

11. An information handling method in which textual metadata is generated and associated with a current information item based on metadata from a plurality of other information items, the method comprising:
    detecting one or more predetermined properties of the current information item, the information items comprising audio and/or video data, and the detecting including detecting one or more properties of the audio and/or video data;
    detecting a subset of the plurality of other information items, the subset being other information items which have the one or more predetermined properties most similar to the one or more predetermined properties of the current information item;
    displaying one or more most frequently occurring words and/or phrases within textual metadata associated with the subset of the plurality of other information items; and
    receiving a selection from the user of one or more of the most frequently occurring words and/or phrases from the selectable list, for use in textual metadata and associating the words and/or phrases in the selection with the current information item;
    generating a feature vector comprising feature data values indicative of the one or more predetermined properties of the current information item; and
    detecting those information items having a feature vector having a shortest Euclidean distance from the feature vector of the current information item.

12. A non-transitory computer readable medium encoded with program code for carrying out a method comprising:
    detecting one or more predetermined properties of the current information item, the information items comprising audio and/or video data, and the detecting including detecting one or more properties of the audio and/or video data;
    detecting a subset of the plurality of other information items, the subset being other information items which have the one or more predetermined properties most similar to the one or more predetermined properties of the current information item;
    displaying one or more most frequently occurring words and/or phrases within textual metadata associated with the subset of the plurality of other information items; and
    receiving a selection from the user of one or more of the most frequently occurring words and/or phrases from the selectable list, for use in textual metadata and associating the words and/or phrases in the selection with the current information item;

generating a feature vector comprising feature data values indicative of the one or more predetermined properties of the current information item; and detecting those information items having a feature vector having a shortest Euclidean distance from the feature vector of the current information item.

* * * * *